Jan. 29, 1957  L. A. ARCHER  2,779,930
ELECTRICAL CONNECTION MEANS AND METHODS
Filed Dec. 15, 1953  2 Sheets-Sheet 1
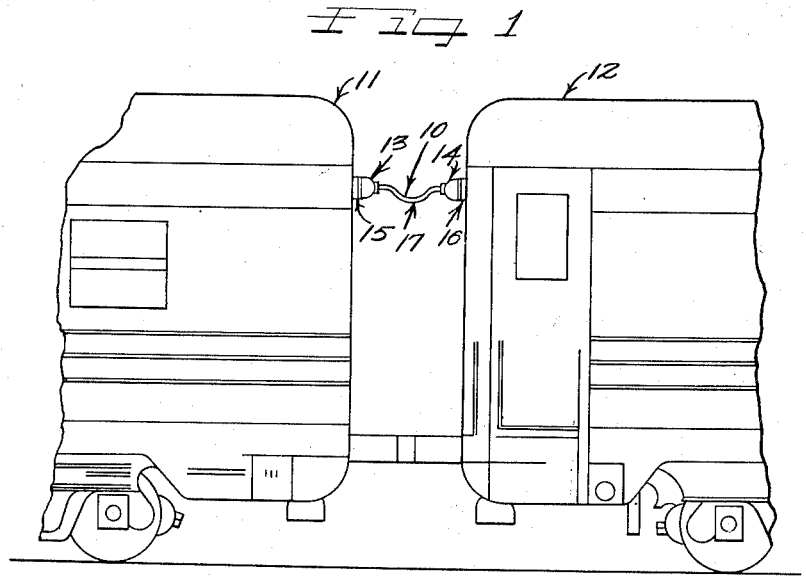
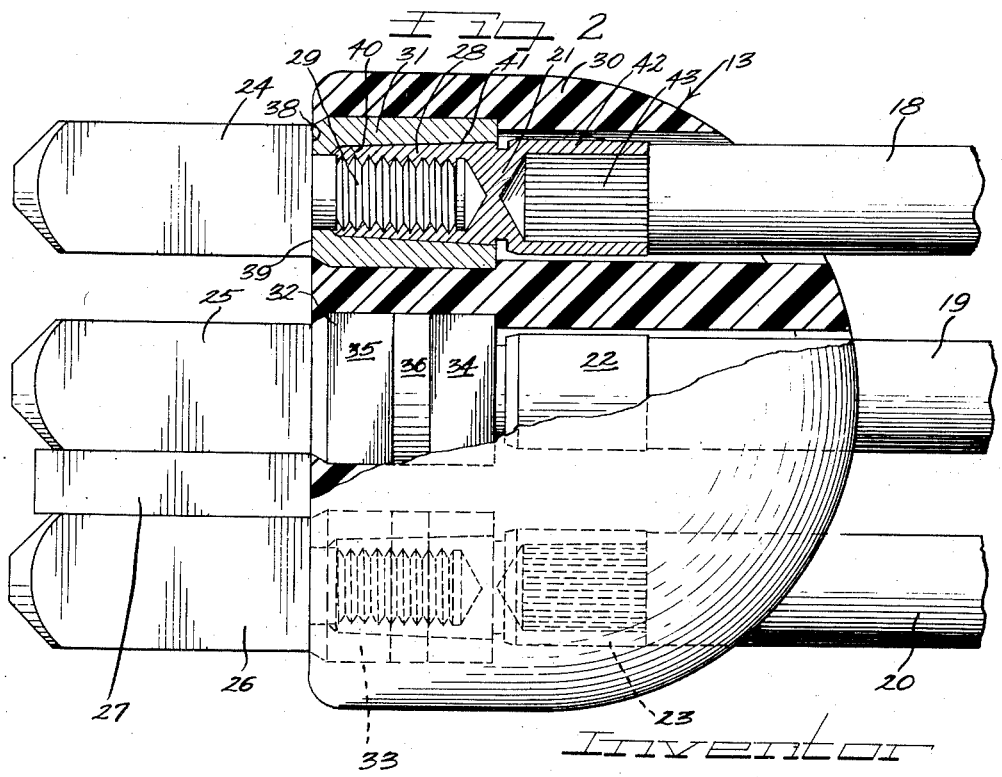
Inventor
Lee A. Archer Jan. 29, 1957 L. A. ARCHER 2,779,930
ELECTRICAL CONNECTION MEANS AND METHODS
Filed Dec. 15, 1953 2 Sheets-Sheet 2
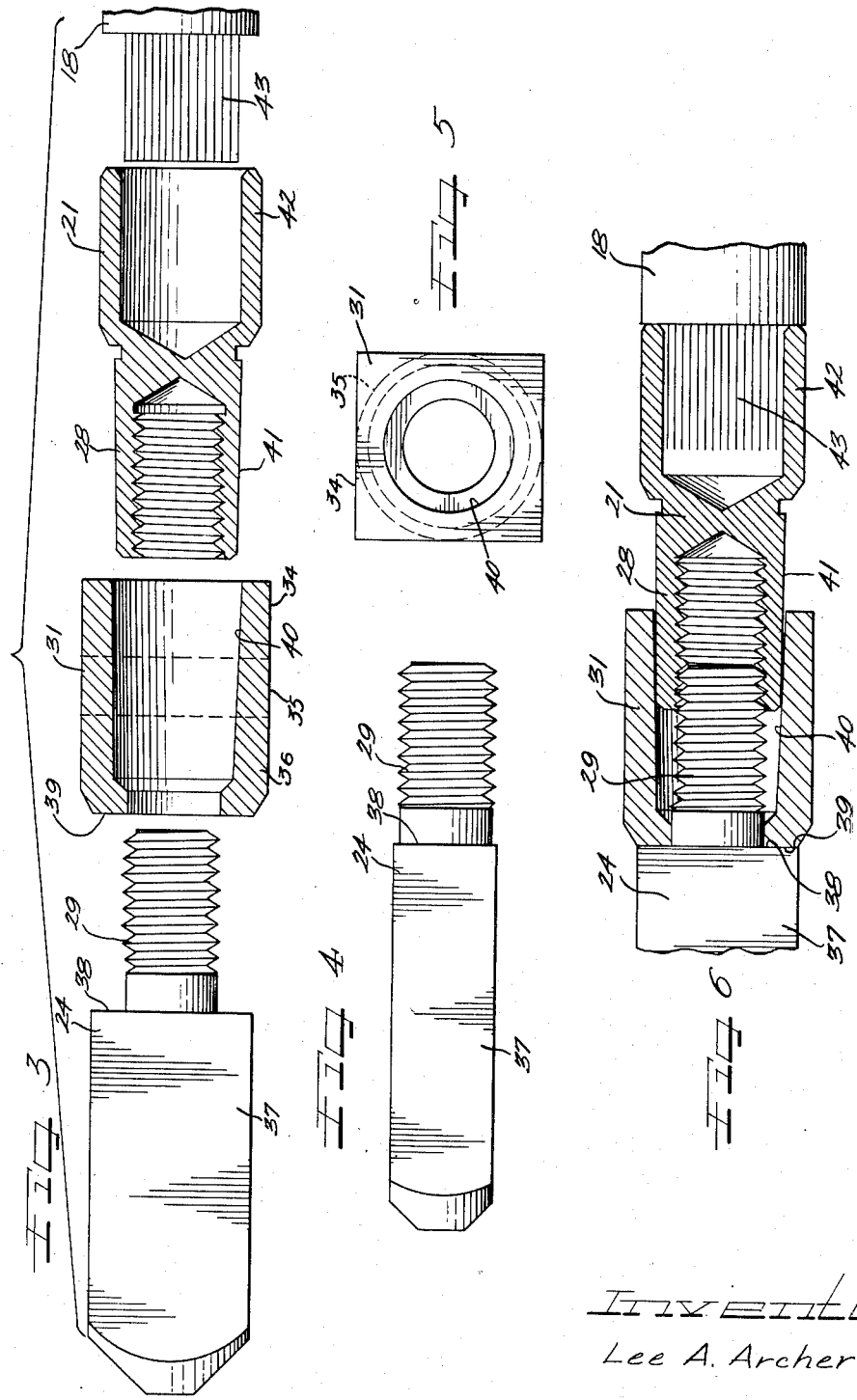
Inventor
Lee A. Archer

United States Patent Office 2,779,930
Patented Jan. 29, 1957

2,779,930

ELECTRICAL CONNECTION MEANS AND METHODS

Lee A. Archer, Wheaton, Ill., assignor to The Pyle-National Company, Chicago, Ill., a corporation of New Jersey Application December 15, 1953, Serial No. 398,272

8 Claims. (Cl. 339—270)

This invention relates to electrical connection means and methods particularly adapted for making electrical connection between cars of a railroad train. However, as will appear, the principles of this invention have application to all types of connection means.

In the electrical connection means and methods of this invention, a contact member is removably secured to a lug, preferably through a threaded interengagement and most preferably, the contact member has an externally threaded portion threaded into an internally threaded portion of the lug. The lug may preferably be secured to the end of a cable or wire and the contact member may be in the form of a male plug member arranged to be inserted into a suitable receptacle. However, it will be understood that in accordance with the broad aspects of the invention, the terms contact member and lug embrace any two members which it may be desired to connect together.

To support the lug and contact member, means are provided in surrounding relation to at least a portion of the lug, which means preferably extends between opposed portions of the contact member and lug for limiting movement of the lug and contact member relative thereto. Such means may most preferably take the form of a bushing which may be metallic and is preferably embedded in a body of insulating material. With this arrangement, the lug and contact member may be readily connected and disconnected but when they are connected, they are securely supported.

According to a specific feature of this invention, the bushing has at least one rectangular external surface portion embedded internally in the body of insulating material to prevent movement of the body relative thereto. Preferably, the bushing may have spaced rectangular external surface portions with a cylindrical portion therebetween. When the bushing is embedded in the body of insulating material which may be accomplished by a molding process, the insulating material will extend into contact with the cylindrical portion to form ribs between the rectangular portions preventing lengthwise movement of the bushing. Rotation of the bushing is, of course, prevented by the fact that the portions on either side of the cylindrical portion are rectangular.

According to an important feature of the invention, the lug and the bushing are arranged for wedge interengagement whereby the walls of the lug are deformed into tight frictional engagement with the contact member when the contact member and lug are forced together. For this purpose, either the inner surface of the bushing or the outer surface of the lug should be tapered and in accordance with a specific feature of the invention, both surfaces are tapered with the rate of taper of the outer surface of the lug being initially less than the rate of taper of the inner surface of the bushing. After the lug is wedged into the bushing, the walls of the lug will, of course, be deformed so that the inner surface of the bushing and the outer surface of the lug will have the same rate of taper.

The fact that the lug is tapered is advantageous since the wall thereof may be relatively thin at the terminal end thereof and readily deformed, but the wall becomes increasingly thicker as the distance from the terminal end increases so that there is no sacrifice in strength.

The fact that the inner surface of the bushing is tapered is also a distinct advantage since as the lug is drawn within the bushing, the wall thereof is gradually deformed into frictional engagement with the contact member, which would not be possible if the inner surface of the bushing were perfectly cylindrical.

It is highly desirable and it is a feature of the present invention that either the contact member or the lug or both may be removed and replaced by other sizes or types. For this reason, the walls of the bushing are of such thickness and the material thereof of such hardness relative to the thickness of the wall of the lug and the hardness thereof that only the wall of the lug is deformed and no appreciable deformation of the bushing takes place. The contact member also should be of such hardness that it will not be appreciably deformed.

The lug is preferably forced into wedge engagement within the bushing by rotating the contact member relative thereto and effecting longitudinal movement of the lug through the threaded interengagement of the lug and the contact member. To prevent movement of the bushing relative to the contact member, the contact member may preferably have a shoulder or the like for engaging the end of the bushing. This shoulder and the outer surface of the lug may be considered as opposed surfaces engaged by the bushing to limit movement of the lug and contact member relative thereto.

In effecting interconnection between the contact member and lug, the contact member is so disposed relative to the bushing that the bushing is in surrounding relation to the end portion thereof. The tubular end portion of the lug is then inserted within the bushing and the threads of the lug and contact member engaged. It may be noted at this point that the diameter of the terminal end of the lug is preferably equal to the internal diameter of the tapered inner surface of the bushing at an intermediate point thereof. After the lug and contact member are engaged, the contact member is rotated relative to the lug to draw the lug within the bushing and wedge the walls of the lug into tight frictional engagement with the contact member.

It may be noted that in many applications, it is desirable that the contact member should have a certain angular position relative to the body of insulating material in which the bushing is embedded, or relative to other contact members secured within the body of insulating material, and the contact member may be rotated to such position by the application of sufficient force and once is in the desired position, the frictional interengagement between the contact member and lug will be sufficiently great such that the contact member cannot be jarred out of such position. The connection means and methods of this invention are therefore particularly advantageous when a plurality of contact members and lugs are connected within a single body of insulating material to form a plug or the like. The connection means and methods of this invention are also particularly advantageous where severe jars or vibrations thereof are apt to take place.

An object of this invention, accordingly, is to provide improved connection means and methods.

Another object of this invention is to provide improved connection means and methods wherein two members are securely held together but may be readily disconnected.

A more specific object of this invention is to provide improved connection means and methods wherein the wall of one member is wedged into tight frictional engagement with another member.

A further object of this invention is to provide improved connection means and methods wherein a lug has a tubular portion for receiving a contact member, the lug being telescopingly engaged within a bushing with the walls of the lug wedged within the bushing and deformed into tight frictional engagement with the contact member.

Still another object of this invention is to provide an improved method and means for electrical connection in which a plurality of contact members and lugs are connected together and supported within a body of insulating material.

This invention contemplates other objects, features and advantages which will become more fully apparent from the following detailed description taken in conjunction with the accompanying drawings which illustrate a preferred embodiment and in which:

Figure 1 is a view illustrating a train line plug jumper assembly effecting electrical connection between cars of a railroad train, which assembly utilizes the electrical connection means and methods of this invention;

Figure 2 is an enlarged detail view, partially in section, illustrating the construction of one of the plugs of the assembly of Figure 1;

Figure 3 is an exploded view for illustrating the assembly of a contact member, a bushing, a lug and a cable of the plug illustrated in detail in Figure 2;

Figure 4 is a top plan view of the contact member shown in side elevation in Figure 3;

Figure 5 is an end elevational view of the bushing in Figure 3, looking from right to left; and Figure 6 is a view illustrating an intermediate step in the assembly of the contact member, bushing, lug and cable shown in Figure 3.

In Figure 1, reference numeral 10 generally designates a train line plug and jumper assembly for electrically connecting a pair of railroad cars 11 and 12. The assembly 10 comprises a pair of male plug sub-assemblies 13 and 14 arranged to be engaged with female receptacles 15 and 16, respectively, on the cars 11 and 12, the plugs 13 and 14 being connected by a jumper 17 comprising at least one wire or cable and ordinarily three wires or cables 18, 19 and 20 as indicated in Figure 2 which is an enlarged detail view of the plug assembly 13.

The terminal ends of the cables 18, 19 and 20 are stripped of insulation and are secured to lugs 21, 22 and 23, respectively, so as to make electrical connection therewith, the lugs 21, 22 and 23 being removably secured to contacts 24, 25 and 26, respectively, which are adapted to be inserted into the female receptacle 15. One of the contact members 26 may have a guide finger 27 secured thereto.

To secure the lug 21 to the contact member 24, the lug 21 may preferably have an internally threaded tubular end portion 28 for receiving an externally threaded portion 29 of the contact member 24. The lugs 22 and 23 may have similar internally threaded tubular portions for receiving similar externally threaded portions of the contact members 25 and 26.

The lugs 21, 22 and 23 and the contact members 24, 25 and 26 secured thereto may be supported within a body of insulating material 30, preferably by means of bushings 31, 32 and 33, respectively, embedded within the body of insulating material 30.

The bushings 31, 32 and 33 preferably are embedded within the body 30 of insulating material by a molding process with the body 30 being of rubber, it being understood that the term rubber embraces synthetic as well as natural rubber and all elastomeric, moldable or insulating materials having the general properties of natural rubber.

According to a specific feature of this invention, each of the bushings 31, 32 and 33 has at least one section of polygonal cross-section to prevent relative movement between the bushings and the body 30. Most preferably, each of the bushings 31, 32 and 33 has spaced sections of square cross-section with a section of circular cross-section therebetween. This is illustrated in conjunction with bushing 32 in Figure 2 which has sections 34 and 35 of square cross-section separated by an intermediate section 36 of circular cross-section. It will be appreciated that this provides a very secure engagement of the bushings within the body 30 preventing relative rotation or longitudinal movement.

The features and advantages of the connection means and methods of this invention will be better understood with reference to Figures 3, 4, 5 and 6 which illustrate more in detail the construction and assembly of the contact member 24, the bushing 31, and the lug 21. Referring thereto, the contact member 24 may have a portion 37 of rectangular cross-section with one dimension substantially greater than the other, as will be clear from a comparison of the side elevational view in Figure 3 with the top plan view of Figure 4. This shape is, of course, determined by the particular requirements of the receptacle with which the contact member 24 is employed. Between the portion 37 and the externally threaded portion 29 of the contact member 24 is a shoulder 38 arranged for engaging the end face 39 of the bushing 31 in assembly.

According to a highly important feature of the present invention, the bushing 31 is arranged for telescoping wedge engagement with the tubular portion 28 of the lug 21 such that the wall of the tubular portion 28 is deformed into tight frictional engagement with the externally threaded portion 29 of the contact member 24 when the tubular portion 28 is forced within the bushing 31. For this purpose, either the inner surface 40 of the bushing 31 or the outer surface 41 of the tubular portion 28 of the lug 21 is tapered. It has been discovered, however, that greatly improved results are achieved if both surfaces are tapered. In particular, with the surface 41 of the tubular portion 28 of the lug 21 tapered, the wall at the terminal end thereof may be somewhat thinner than it is at a point spaced from the terminal end so that it can be more readily deformed inwardly but the wall at a point spaced from the terminal end may be sufficiently thick for adequate strength. The fact that the inner surface 40 of the bushing 31 is tapered is also a distinct advantage since as the lug is drawn within the bushing, the wall thereof is gradually deformed into frictional engagement with the contact member, which gradual deformation would not be possible if the inner surface of the bushing 31 were perfectly cylindrical.

Preferably, the tubular portion 28 of the lug 21 will have a substantially circular cross-section so that the surfaces 41 and 40 may be defined as being generally frusto-conical.

The lug 21 may be arranged to be connected to a wire or cable in any desired manner. Preferably, however, the lug 21 may have a second tubular portion 42 arranged to telescopingly receive the terminal end 43 of the cable 18 from which insulation has been removed. After the terminal end 43 of the cable 18 is inserted within the tubular portion 42 of the lug 21, this tubular portion 42 is compressed radially inwardly by severe compressive forces sufficient to cause a bonding action between the metal of the lug 21 and the metal of the terminal end portion 43 of the cable 18.

After the lug 21 is secured to the end of the cable 18, the externally threaded end 29 of the contact member 24 may be inserted within the bushing 31 so that the internal generally cylindrical surface 40 thereof is disposed in surrounding relation to the externally threaded portion 29. The tubular portion 28 of the lug 21 is then inserted within the opposite end of the bushing 31 and threaded onto the externally threaded portion 29 of the contact member 24. The position of the various parts at this point is illustrated in Figure 6. It may be noted that the terminal end of the tubular portion 28 of the lug 21 initially has a diameter equal to the diameter of the tapered generally cylindrical inner surface 40 of the bushing 31 at an intermediate point thereof so that the outer surface 41 of the tubular portion 28 will initially engage the inner generally cylindrical tapered surface 40 after a substantial portion of the tubular portion 28 is within the bushing 31.

After the parts are in the position illustrated in Figure 6, the contact member 24 may be rotated relative to the lug 21 to force the lug into the bushing 31, movement of the bushing 31 being prevented by the engagement between the shoulder 28 on the contact member 24 and the end surface 39 of the bushing 31. As the contact member 24 is rotated relative to the lug 21, the terminal end of the tubular portion 28 of the lug 21 will be gradually wedged radially inwardly toward tight frictional engagement with the externally threaded portion 29 of the contact member 24. As this action continues, portions of the outer generally cylindrical surface 41 of the lug 21 will be forced into contact with the internal surface 40 and wedged toward the externally threaded portion 29 of the contact member 24. Ultimately, substantially the entire outer surface 41 of the tubular portion 28 will become engaged with the inner surface 40 of the bushing 31 with the lug 21 and contact member 24 in tight frictional engagement. This tight frictional engagement will prevent any relative movement between the contact member 24 and lug 21, even with severe jars and vibrations, and once the contact member 24 is rotated into the desired position relative to the other contact members 25 and 26, it will remain fixed in that position. However, if it should for any reason become necessary to remove the contact members as when the contact members become burned or pitted, this can be accomplished by applying sufficient torque to the contact members and they can be readily removed and replaced.

Since it is expected that the lug and contact member might be removed and replaced, it is highly desirable that the bushing 31 should not be appreciably deformed when the contact member and lug are secured together. For this reason, the walls of the bushing should be of such thickness and the material thereof of such hardness relative to the thickness of the wall of the tubular portion 28 and the hardness of the material thereof that only the walls of the bushing are deformed. It has been found that excellent results are achieved in practice with the relative thickness of the walls of the bushing and the lug being as illustrated in the drawing and with the bushing of a hardness referred to as "half hard" in the art and with the lug of annealed brass having a hardness referred to as "dead soft" in the art.

As an additional advantage of the arrangement of this invention, it has been found possible to use a comparatively loose fit between the threads of the contact member and the threads of the lug since the walls of the lug will automatically be deformed into tight frictional engagement with the contact member in assembly. In particular, it has been found possible to use a fit referred to in the art as a class 3 fit without in any way impairing the operation of the structure. As those skilled in the art will readily appreciate, a considerable economy in manufacture is obtained if an accurate thread fit is not required.

It is, of course, desirable that the contact member should be relatively hard and, like the bushing, it is preferably of brass of a hardness referred to in the art as "half hard."

It will, of course, be understood that while the various features of the invention have been described in detail in order that those skilled in the art might most readily apply the invention, the broad aspects of the invention are not limited thereto.

It will further be understood that various modifications and variations may be effected without departing from the spirit and scope of the novel concepts of the present invention.

I claim as my invention:

1. In an electrical plug and socket connector, the improvement of a contact assembly comprising a contact member providing a contact surface of appreciable longitudinal extent and further providing an externally threaded neck axially adjacent said contact surface, a bushing member having an open ended bore extending therethrough, said bushing being internally tapered to form the walls of said bore, a lug member having a sleeve portion providing an externally tapered peripheral surface and an internally threaded recess, said lug member further including conductor fastening means adjacent said sleeve portion, said threaded neck being inserted in said bore and threadedly engaging said sleeve portion of said lug member, said tapered peripheral surface of said sleeve portion of said lug member engaging said tapered walls of said bore of said bushing member to lock said contact member, said bushing member and said lug member in firm assembly and in electrically conductive relation with one another, and a body member of insulating material embedding said bushing member in firm assembly therewith and providing an insulating enclosure for said lug member and the conductor fastening means thereof.

2. In an electrical plug and socket connector as defined in claim 1, said tapered walls and said tapered peripheral surface having different degrees of taper to improve the locking and electrical contact action between the parts.

3. In an electrical plug and socket connector as defined in claim 2, said bushing member and said lug member being made of metal of different degrees of hardness to facilitate radial contractability of said sleeve portion with minimum torque.

4. In an electrical connector for a cable, a lug secured to the end of said cable and having an internally threaded tubular end portion, a body of insulating material, a bushing embedded within said body having an inner surface for wedge engagement with the tubular end portion of said lug, and a contact member having an externally threaded end portion threaded onto said tubular end portion of said lug and having a shoulder for engaging said bushing for drawing said tubular end portion of said lug within said bushing and wedging the walls thereof into tight frictional engagement with said externally threaded portion of said contact member.

5. In an electrical connector, a bushing having a tapered inner surface, and a lug having a tapered outer surface telescopingly engaged within said tapered inner surface of said bushing, the rate of taper of said outer surface being initially less than the rate of taper of said inner surface.

6. In an electrical connector for a plurality of cables, a lug secured to the end of each of said cables and having an internally threaded tubular end portion, a body of rubber, a plurality of bushings embedded within said body each having an inner surface for wedge engagement with the tubular end portion of one of said lugs, and a plurality of contact members having externally threaded end portions threaded onto said tubular end portion of said lugs and having shoulders for engaging said bushings for drawing said tubular end portions of said lugs within said bushings and wedging the walls thereof into tight frictional engagement with said externally threaded portions of said contact members.

7. In an electrical connector as defined in claim 4 said lug having a tapered outer surface telescopingly engaged within said tapered inner surface of said bushing, the rate of taper of said outer surface being initially less than the rate of taper of said inner surface.

8. In an electrical connector as defined in claim 4 said lug having a tapered outer surface telescopingly engaged within said tapered inner surface of said bushing, the rate of taper of said outer surface being initially less than the rate of taper of said inner surface, said bushing being made of a material appreciably harder than the material comprising the lug, thereby to compress the lug radially inwardly.

References Cited in the file of this patent

UNITED STATES PATENTS

| | | |
|---|---|---|
| 1,438,454 | Mitchell | Dec. 12, 1922 |
| 1,507,936 | Schmitt | Sept. 9, 1924 |
| 2,379,424 | Clinkscale | July 3, 1945 |
| 2,567,783 | Richardson | Sept. 11, 1951 |